US011557403B2

(12) United States Patent
Venneri

(10) Patent No.: US 11,557,403 B2
(45) Date of Patent: Jan. 17, 2023

(54) PROCESS FOR RAPID PROCESSING OF SIC AND GRAPHITIC MATRIX TRISO-BEARING PEBBLE FUELS

(71) Applicant: ULTRA SAFE NUCLEAR CORPORATION, Seattle, WA (US)

(72) Inventor: Francesco Venneri, Seattle, WA (US)

(73) Assignee: Ultra Safe Nuclear Corporation, Seattle, WA (US)

( * ) Notice: Subject to any disclaimer, the term of this patent is extended or adjusted under 35 U.S.C. 154(b) by 231 days.

(21) Appl. No.: 17/102,895

(22) Filed: Nov. 24, 2020

(65) Prior Publication Data
US 2021/0210235 A1 Jul. 8, 2021

Related U.S. Application Data

(62) Division of application No. 15/444,442, filed on Feb. 28, 2017, now Pat. No. 10,878,971.
(Continued)

(51) Int. Cl.
*G21C 21/02* (2006.01)
*C04B 35/52* (2006.01)
(Continued)

(52) U.S. Cl.
CPC .............. *G21C 21/02* (2013.01); *B28B 1/008* (2013.01); *B28B 3/02* (2013.01); *B28B 13/0205* (2013.01); *C04B 35/51* (2013.01); *C04B 35/522* (2013.01); *C04B 35/532* (2013.01); *C04B 35/575* (2013.01); *C04B 35/628* (2013.01); *C04B 35/62813* (2013.01); *C04B 35/62815* (2013.01); *C04B 35/62831* (2013.01);
(Continued)

(58) Field of Classification Search
CPC ................................. G21C 3/626; G21C 3/28
See application file for complete search history.

(56) References Cited

U.S. PATENT DOCUMENTS 2,950,238 A 8/1960 Nicholson
3,826,754 A 7/1974 Grossman
(Continued)

FOREIGN PATENT DOCUMENTS

CN 101 188 147 B 7/2011
CN 105 139 898 A 12/2015
(Continued)

OTHER PUBLICATIONS

International search report and the written opinion dated Aug. 8, 2017 issued in corresponding international patent application No. PCT/US2017/019887 (13 pages).
(Continued)

*Primary Examiner* — Peter F Godenschwager
(74) *Attorney, Agent, or Firm* — RatnerPrestia

(57) ABSTRACT

A method for producing microencapsulated fuel pebble fuel more rapidly and with a matrix that engenders added safety attributes. The method includes coating fuel particles with ceramic powder; placing the coated fuel particles in a first die; applying a first current and a first pressure to the first die so as to form a fuel pebble by direct current sintering. The method may further include removing the fuel pebble from the first die and placing the fuel pebble within a bed of non-fueled matrix ceramic in a second die; and applying a second current and a second pressure to the second die so as to form a composite fuel pebble.

10 Claims, 5 Drawing Sheets

Related U.S. Application Data

(60) Provisional application No. 62/314,705, filed on Mar. 29, 2016.

(51) Int. Cl.

| | | |
|---|---|---|
| *C04B 35/575* | (2006.01) | |
| *C04B 35/628* | (2006.01) | |
| *C04B 35/638* | (2006.01) | |
| *G21C 3/28* | (2006.01) | |
| *C04B 35/634* | (2006.01) | |
| *B28B 1/00* | (2006.01) | |
| *G21C 3/58* | (2006.01) | |
| *C04B 35/532* | (2006.01) | |
| *B28B 3/02* | (2006.01) | |
| *C04B 35/51* | (2006.01) | |
| *C04B 35/645* | (2006.01) | |
| *B28B 13/02* | (2006.01) | |

(52) U.S. Cl.
CPC .. *C04B 35/62834* (2013.01); *C04B 35/62839* (2013.01); *C04B 35/62894* (2013.01); *C04B 35/62897* (2013.01); *C04B 35/638* (2013.01); *C04B 35/63476* (2013.01); *C04B 35/645* (2013.01); *G21C 3/28* (2013.01); *G21C 3/58* (2013.01); *C04B 2235/3217* (2013.01); *C04B 2235/3224* (2013.01); *C04B 2235/3225* (2013.01); *C04B 2235/3826* (2013.01); *C04B 2235/425* (2013.01); *C04B 2235/48* (2013.01); *C04B 2235/604* (2013.01); *C04B 2235/666* (2013.01); *C04B 2235/94* (2013.01); *Y02E 30/30* (2013.01)

(56) References Cited

U.S. PATENT DOCUMENTS

| | | | |
|---|---|---|---|
| 3,907,948 | A | 9/1975 | Gyarmati et al. |
| 4,297,169 | A | 10/1981 | Grubb |
| 4,597,936 | A | 7/1986 | Kaae |
| 4,683,114 | A | 7/1987 | Ho et al. |
| 4,707,330 | A | 11/1987 | Ferrari |
| 4,869,867 | A | 9/1989 | Lay et al. |
| 4,869,886 | A | 9/1989 | Saiki et al. |
| 4,963,758 | A | 10/1990 | Noren et al. |
| 4,978,480 | A | 12/1990 | Stansfield et al. |
| 5,268,947 | A | 12/1993 | Bastide et al. |
| 5,805,657 | A | 9/1998 | Heubeck |
| 6,162,543 | A | 12/2000 | Dubots et al. |
| 8,475,747 | B1 | 7/2013 | Johnson et al. |
| 9,224,506 | B2 | 12/2015 | Broli et al. |
| 9,299,464 | B2 | 3/2016 | Venneri et al. |
| 10,032,528 | B2 | 7/2018 | Venneri |
| 10,109,378 | B2 | 10/2018 | Snead |
| 10,573,416 | B2 | 2/2020 | Venneri |
| 2003/0113447 | A1 | 6/2003 | Sherwood et al. |
| 2005/0195933 | A1 | 9/2005 | Dorr et al. |
| 2006/0039524 | A1 | 2/2006 | Feinroth et al. |
| 2008/0159464 | A1 | 7/2008 | Futterer et al. |
| 2008/0240334 | A1 | 10/2008 | Senor et al. |
| 2009/0032178 | A1 | 2/2009 | Feinroth |
| 2010/0290578 | A1 | 11/2010 | Farrell et al. |
| 2010/0296621 | A1 | 11/2010 | Broli et al. |
| 2011/0080987 | A1 | 4/2011 | Watanabe et al. |
| 2011/0091004 | A1 | 4/2011 | Farmer et al. |
| 2011/0169178 | A1 | 7/2011 | Picart et al. |
| 2011/0317794 | A1 | 12/2011 | Venneri et al. |
| 2012/0140867 | A1 | 6/2012 | Venneri et al. |
| 2012/0207264 | A1 | 8/2012 | Van Den Berghe et al. |
| 2013/0077731 | A1 | 3/2013 | Sherwood et al. |
| 2013/0114781 | A1 | 5/2013 | Venneri et al. |
| 2014/0220230 | A1 | 8/2014 | Kuczynski |
| 2015/0170767 | A1 | 6/2015 | Venneri |
| 2015/0221398 | A1 | 8/2015 | Subhash et al. |
| 2015/0310948 | A1 | 10/2015 | Venneri et al. |
| 2017/0025192 | A1 | 1/2017 | Snead |
| 2017/0287575 | A1 | 10/2017 | Venneri |
| 2017/0287577 | A1 | 10/2017 | Venneri |
| 2017/0301415 | A1 | 10/2017 | Venneri |
| 2017/0301423 | A1 | 10/2017 | Pierce |

FOREIGN PATENT DOCUMENTS

| | | |
|---|---|---|
| CN | 105 185 418 A | 12/2015 |
| JP | 2006-504086 A | 2/2006 |
| JP | 2006-234405 A | 9/2006 |
| JP | 2007-010472 A | 1/2007 |
| JP | 2007-086024 A | 4/2007 |
| JP | 2010-512529 A | 4/2010 |
| KR | 10-2013-0102766 A | 9/2013 |
| KZ | 30987 A4 | 3/2016 |
| RU | 1656974 C | 10/1993 |
| RU | 2317601 C1 | 2/2008 |
| RU | 76744 U1 | 9/2008 |
| RU | 2516282 C2 | 5/2014 |
| RU | 2013130000 A | 1/2015 |
| WO | WO-2008/071676 A1 | 6/2008 |
| WO | WO-2009/058185 A2 | 5/2009 |
| WO | WO-2009/079068 A2 | 6/2009 |
| WO | WO-2010/086431 A1 | 8/2010 |
| WO | WO-2012/047657 A2 | 4/2012 |
| WO | WO-2012/047657 A3 | 7/2012 |
| WO | WO-2012/129677 A1 | 10/2012 |
| WO | WO-2014/028731 A1 | 2/2014 |
| WO | WO-2017/019620 A1 | 2/2017 |

OTHER PUBLICATIONS

International Search Report and Written Opinion dated Dec. 8, 2016 issued in corresponding International Patent Application No. PCT/US2016/043897 (10 pages).

International Search Report and Written Opinion dated Mar. 13, 2017 in corresponding International patent application No. PCT/US2016/063975 (13 pages).

International Search Report and Written Opinion dated Jul. 11, 2017 issued in corresponding International patent application No. PCT/US2017/024794 (15 pages).

International Preliminary Report on Patentability dated Jun. 4, 2013, in International Patent Application No. PCT/US2011/062560, filed Nov. 30, 2011.

K. D. Weaver et al., Gen IV Nuclear Energy Systems: Gas-Cooled Fast Reactor (GFR), FY-04 Annual Report, Sep. 2004, Idaho National Engineering and Environmental Laboratory, INEEL/EXT-04-02361.

M. K. Meyer et al., Fuel Development for Gas-Cooled Fast Reactors, Journal of Nuclear Materials, 371 (2007), pp. 281-287.

Sterbentz, J.W. et al., "Reactor Physics Parametric and Depletion Studies in Support of TRISO Particle Fuel Specification for the Next Generation Nuclear Plant," INEEL/EXT-04-02331, Sep. 2004, Idaho National Engineering and Environmental Laboratory, Idaho Falls, Idaho.

TRISO-Coated Particle Fuel Phenomenon Indentification and Ranking Tables (PIRTs) for Fission Product Transport Due to Manufacturing, Operations, and Accidents, NUREG-6844, vol. 1, Jul. 2004, U.S. Nuclear Regulatory Commission, Washington, DC.

TRISCO-Coated Particle Fuel Phenomenon Identification and Ranking Tables (PIRTs) for Fission Product Transport Due to Manufacturing, Operations, and Accidents, Appendices A through D, NUREG-6844, vol. 2, Jul. 2004, U.S. Nuclear Regulatory Commission, Washington, DC.

TRISCO-Coated Particle Fuel Phenomenon Identification and Ranking Tables (PIRTs) for Fission Product Transport Due to Manufacturing, Operations, and accidents, Appendices E through I, NUREG-6844 vol. 3, Jul. 2004, U.S. Nuclear Regulatory Commission, Washington, DC.

U.S. Office Action dated Jan. 8, 2014 that issued in U.S. Appl. No. 12/959,115 including Double Patenting Rejections on pp. 3-5.

(56) References Cited

OTHER PUBLICATIONS

International Preliminary Report on Patentability and Written Opinion dated Oct. 11, 2018 issued in international patent application No. PCT/US2016/063975, filed Nov. 29, 2016.
International Preliminary Report on Patentability and Written Opinion dated Oct. 11, 2018 issued in international patent application No. PCT/US2017/019887, filed Feb. 28, 2017.
International Preliminary Report on Patentability and Written Opinion dated Oct. 11, 2018 issued in international patent application No. PCT/US2017/024794, filed Mar. 29, 2017.
Extended European search report dated Sep. 19, 2019 issued in European patent application No. 16897455.8.
IAEA Safeguards Glossary, 2001 Edition, International Nuclear Verification Series No. 3. (Year: 2002).
Partial supplementary European search report dated Oct. 9, 2019 issued in European patent application No. 17776183.0.
Extended European search report dated Oct. 21, 2019 issued in European patent application No. 17776569.0.
Chen, Z. "Effects of Gadolinia and Alumina Addition on the Densification and Toughening of Silicon Carbide," J. Am. Ceram. Soc, 1996, 79(2), pp. 530-532.
Raju, K. et al., "Sintering additives for SiC based on the reactivity: A review," Ceramics International 2016, http://dx.doi.org/10.1016/j.ceramint.2016.09.022.
U.S. Office Action dated Nov. 19, 2019 that issued in U.S. Appl. No. 15/363,060 including Double Patenting Rejections on pp. 8 and 9.
Extended European search report dated Jan. 23, 2020 issued in European patent application No. 17776183.0.
First Russian Office Action issued in Russian patent application No. 2018137808, dated Apr. 27, 2020 (7 pages) and its English-language translation thereof (8 pages).
Decision to Grant issued in Russian patent application No. 2018106636 dated Mar. 26, 2020 (8 pages) and its English-language translation thereof (5 pages).
Talamo, A. "Conceptual Design of Quadriso Particles with Europium Burnable Absorber in HTRS" Argonne National Laboratory, Argonne (2010); available at https://publications.anl.gov/anlpubs/2010/05/66879.pdf (Year:2010).
U.S. Office Action dated May 18, 2020 that issued in U.S. Appl. No. 15/363,060 including Double Patenting Rejections on pp. 8-10.
European Communication Pursuant to Article 94(3) EPC for Application No. 17776183.0, dated Mar. 3, 2021, 7 pages.
Yano, T. et al., "Effects of $SiO_2$ and Rare-Earth Oxide Additions on Densification and Mechanical Properties of Silicon Carbide Ceramics" Key Engineering Materials 247 (2003) 165-168. (Year: 2003).
Talamo, A. "Effects of the burnable poison heterogeneity on the long term control of excess of reactivity" Annals of Nuclear Energy 33 (2006) 794-803. (Year: 2006).
Indian Examination Report for Indian Application No. 201817037157, dated Nov. 18, 2021, with translation, 7 pages.

PROCESS FOR RAPID PROCESSING OF SIC AND GRAPHITIC MATRIX TRISO-BEARING PEBBLE FUELS

CROSS-REFERENCE TO RELATED APPLICATION

This application is a divisional of U.S. patent application Ser. No. 15/444,442 (allowed), filed Feb. 28, 2017, which claims benefit to U.S. provisional application No. 62/314,705 filed on Mar. 29, 2016, the disclosure of each of which is hereby incorporated by this reference in its entirety.

TECHNICAL FIELD

The present disclosure relates to fission nuclear fuels. More specifically, the present disclosure describes an improved processing method for a spherical fuel pebble including microencapsulated tri-structure isotropic (TRISO) fuels.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

There are many known types of nuclear fuel for both research and power producing nuclear reactors. The fuel can be of many types, including both fissionable (fissile) isotopes and fissile-producing (fertile) isotopes of Uranium, Plutonium, or Thorium, forming as example ceramic carbides, oxides, nitrides, or silicides. With the near complete dominance of current generation of light-water reactors (LWR's) for nuclear power production uranium dioxide ($UO_2$) pellets have become the de facto standard nuclear fuel. The $UO_2$ pellet is used in a pressured water reactor (PWR) and the boiling water reactor (BWR) configurations, being mass-produced through a ceramic processing route: once a powder of appropriate purity and fissile isotope enrichment is achieved it is pressed and then sintered in the presence of hydrogen and taken to final dimension by center-less grinding. Once the finished product is qualified it is placed inside a zirconium alloy tube and weld-sealed in an inert helium environment. This zirconium tube, during normal reactor operation, serves a number of functions including the plenum (barrier) for containment of the radiotoxic fission product gases.

A second example of nuclear fuel is an inert matrix fuel (IMF) in which a fissile material such as (or containing) U-235 is dispersed in an inert host matrix. That inert matrix may be SiC. In this case, the host matrix may contain the fission product that is produced. Yet a third example of nuclear fuel used in high temperature gas cooled (HTGR) reactors in both the prismatic and pebble-bed core configurations have been in the mix of fission research and power production reactors is a microencapsulated fuel (such as the TRISO fuel) whereby the SiC layer of the small diameter microencapsulated fuel provides a first barrier to fission product release and a large number of these fuel beads are typically compacted in a porous graphite matrix.

To form a rigid fuel body, these TRISO or alternate microencapsulated fuels are mixed with some ceramic matrix precursor and formed as an example into either cylindrical ceramics for the modular high temperature gas cooled reactor (MHTGR) or spheres for the pebble bed modular reactor (PBMR). Historically, the matrix that binds the TRISO together for both MHTGR and PBMR fuel forms has been graphitic, though some research and development has been carried whereby the graphite matrix was then overcoated with a thin SiC layer to increase pebble strength and wear resistance.

More recently, a fuel form has been developed whereby TRISO fuel, rather than being compacted within a graphite matrix, as is the case for HTGR, is compacted within a strong and impermeable fully dense silicon carbide matrix. That fuel has been developed and previously described as a more robust fuel whereby the SiC layer of the microencapsulated "TRISO" fuel and the dense ceramic SiC matrix into which they are contained provide two barriers to fission product release in addition to any external cladding that may be present. A secondary barrier to fission product release significantly enhances the safety aspects of a nuclear fuel and reduces the related safety systems of modern LWR's, as well as benefiting gas-cooled reactors.

SUMMARY

The present disclosure provides a new fabrication method for compacting microencapsulated fuel including TRISO fuel into spherical fuel compacts (pebbles) for nuclear reactor application. The process by which the pebbles are manufactured utilizes a direct current sintering (DCS) technique producing desired matrix microstructure and properties at a minimum of combined time, temperature and pressure over historic pebble fabrication routes. Desirable compacted matrix microstructure and microencapsulation integrity have been demonstrated for historic graphitic matrix to provide improved economics of fuel production. Similarly, by utilizing this process the first robust and impermeable SiC matrix pebble fuel is realized providing both process-economic benefit and enhanced fuel safety.

One method that achieves production of a pebble fuel includes: coating fuel particles with ceramic powder; placing the coated fuel particles in a first die; and applying a first current and a first pressure to the first die so as to form a fuel pebble by direct current sintering.

In an embodiment, according to the above method, the method further includes removing the fuel pebble from the first die and placing the fuel pebble within a bed of non-fueled matrix ceramic in a second die; and applying a second current and a second pressure to the second die so as to form a composite fuel pebble.

In an embodiment according to the above method, the fuel particles are tristructural-isotropic fuel particles (TRISO).

In an embodiment according to any of the above methods, the ceramic powder comprises graphite or silicon carbide. The composition of the non-fueled matrix ceramic can be the same as the ceramic powder. The composition of the non-fueled matrix ceramic can include the same constituents as the ceramic powder, but in different amounts. The composition of the non-fueled matrix ceramic can include the same primary constituent as the ceramic powder, such as graphite or silicon carbide, but have different additional constituents. The composition of the non-fueled matrix ceramic can also include a completely different constituents from that of the ceramic powder.

In an embodiment according to the above methods, the ceramic powder, the non-fueled matrix ceramic, or both includes graphite. In further embodiments, the non-fueled matrix ceramic, the ceramic powder, or both further includes phenolic or other resin binder.

In an embodiment according to any of the above methods, the ceramic powder, the non-fueled matrix ceramic, or both includes silicon carbide. In further embodiments, the non-fueled matrix ceramic, the ceramic powder, or both further includes a rare-earth oxide neutronic poison selected from the group consisting of $Gd_2O_3$, $Er_2O_3$, $Dy_2O_3$, and $Eu_2O_3$, and combinations thereof. In yet further embodiments, the non-fueled matrix ceramic, the ceramic powder, or both further includes sintering additives selected from the group consisting of $Al_2O_3$ and $Y_2O_3$ and combinations thereof. In yet further embodiments, the combination of the rare earth oxide neutronic poison and any additional sintering additives is in an amount up to 10 weight percent, 0.5 to 10 weight percent, 1 to 10 weight percent, 1 to 6 weight percent, or 2 to 6 weight percent of the total weight of the non-fueled matrix ceramic, the ceramic powder, or each of the non-fueled matrix ceramic and the ceramic powder.

In an embodiment according to any of the above methods, the method further includes adding additional non-fueled matrix ceramic above the fuel pebble in the second die.

In an embodiment according to any of the above methods, the step of coating the fuel particles includes over-coating through rotary evaporator or fluidized bed.

In an embodiment according to any of the above methods, the method further includes machining the fuel pebble or the composite fuel pebble to smooth an outer surface of the fuel pebble or the composite fuel pebble.

In an embodiment according to any of the above methods, the method further includes inspecting the fuel core after removal from the first die and before placing in the second die.

In an embodiment according to any of the above methods, the first pressure, the second pressure, or each of the first and second pressures is less than 30 MPa, or, in certain embodiments, less than 20 MPa, or, in more certain embodiments, about 10 MPa.

In an embodiment according to any of the above methods, the nuclear fuel pebble includes near stoichiometric SiC. In certain embodiments, the ceramic powder, the non-fueled matrix ceramic, or both has a low porosity, for example, less than 4%, less than 3%, or less than 1%. In such embodiments, the ceramic powder, the non-fueled matrix ceramic, or both forms a gas-impermeable barrier that acts as a secondary barrier to fission products/actinides diffusion and other radioactivity releases from the fuel particles. In certain embodiments, the ceramic powder, the non-fueled matrix ceramic, or both has low permeability to helium, for example less than $10^{-10}$ $m^2/s$, or less than $10^{-11}$ $m^2/s$.

In an embodiment according to any of the above methods, the ceramic powder, the non-fueled matrix ceramic, or both includes SiC having an average size of less than 1 μm, or, in certain embodiments, 15 nm to 60 nm, or, in more certain embodiments, 20 nm to 50 nm, or, in yet more certain embodiments, about 35 nm.

In an embodiment according to any of the above methods, the ceramic powder, the non-fueled matrix ceramic, or both includes SiC having a specific surface area greater than 20 $m^2/g$.

A nuclear fuel pebble obtained from methods similar to those described above includes: an inner fuel pebble including fuel particles microencapsulated within a fully ceramic matrix; and a non-fueled matrix ceramic surrounding the inner fuel pebble.

In an embodiment according to any of the above nuclear fuel pebbles, the nuclear fuel pebble includes near stoichiometric SiC forming the ceramic matrix, the non-fueled matrix ceramic, or both. In certain embodiments, the ceramic matrix, the non-fueled matrix ceramic, or both has a low porosity, for example, less than 4%, less than 3%, or less than 1%. In such embodiments, the ceramic matrix, the non-fueled matrix ceramic, or both forms a gas-impermeable barrier that acts as a secondary barrier to fission products/actinides diffusion and other radioactivity releases from the fuel particles. In certain embodiments, the ceramic matrix, the non-fueled matrix ceramic, or both has low permeability to helium, for example less than $10^{-10}$ $m^2/s$, or less than $10^{-11}$ $m^2/s$.

In an embodiment according to any of the above nuclear fuel pebbles, the ceramic matrix, the non-fueled matrix ceramic, or both includes SiC having an average size of less than 1 μm, or, in certain embodiments, 15 nm to 60 nm, or, in more certain embodiments, 20 nm to 50 nm, or, in yet more certain embodiments, about 35 nm.

In an embodiment according to any of the above nuclear fuel pebbles, the ceramic matrix, the non-fueled matrix ceramic, or both includes SiC having a specific surface area greater than 20 $m^2/g$.

In an embodiment according to any of the above nuclear fuel pebbles, the fuel particles are tristructural—isotropic fuel particles (TRISO).

In an embodiment according to any of the above nuclear fuel pebbles, the ceramic matrix includes graphite or silicon carbide. The composition of the non-fueled matrix ceramic can be the same as the ceramic matrix. The composition of the non-fueled matrix ceramic can include the same constituents as the ceramic matrix, but in different amounts. The composition of the non-fueled matrix ceramic can include the same primary constituent as the ceramic matrix, such as graphite or silicon carbide, but have different additional constituents. The composition of the non-fueled matrix ceramic can also include completely different constituents from that of the ceramic matrix.

In an embodiment according to the above nuclear fuel pebbles, the ceramic matrix, the non-fueled matrix ceramic, or both includes graphite. In further embodiments, the non-fueled matrix ceramic, the ceramic matrix, or both further includes phenolic or other resin binder.

In an embodiment according to any of the above nuclear fuel pebbles, the ceramic matrix, the non-fueled matrix ceramic, or both includes silicon carbide. In further embodiments, the non-fueled matrix ceramic, the ceramic matrix, or both further includes a rare-earth oxide neutronic poison selected from the group consisting of $Gd_2O_3$, $Er_2O_3$, $Dy_2O_3$, and $Eu_2O_3$, and combinations thereof. In yet further embodiments, the non-fueled matrix ceramic, the ceramic matrix, or both further includes sintering additives selected from the group consisting of $Al_2O_3$ and $Y_2O_3$ and combinations thereof. In yet further embodiments, the combination of the rare earth oxide neutronic poison and any additional sintering additives is in an amount up to 10 weight percent, 0.5 to 10 weight percent, 1 to 10 weight percent, 1 to 6 weight percent, or 2 to 6 weight percent of the total weight of the non-fueled matrix ceramic, the ceramic matrix, or each of the non-fueled matrix ceramic and the ceramic matrix.

In an embodiment according to any of the above nuclear fuel pebbles, the non-fueled matrix ceramic, the ceramic matrix, or both include pockets including only rare earth oxide neutronic poisons and tramp elements. In another embodiment according to any of the above nuclear fuel pebbles, the pockets include only rare earth oxide neutronic poisons, additional sintering additives, and tramp elements, wherein the additional sintering additives can include the same materials discussed above for additional sintering additives.

In an embodiment according to any of the above nuclear fuel pebbles or any of the above methods, the nuclear fuel pebble further includes a second non-fueled matrix ceramic layer. The second non-fueled matrix ceramic may include any of the materials discussed above for the non-fueled matrix ceramic. The second non-fueled matrix ceramic may have the same composition as the non-fueled matrix ceramic or the ceramic matrix. The second non-fueled matrix ceramic may have a different composition from both the non-fueled matrix ceramic and the ceramic matrix. The difference in composition may be in only the amounts of the constituents, only some of the constituents, or in all of the constituents.

In an embodiment according to any of the above nuclear fuel pebbles or any of the above methods, the fuel particles include transuranic elements extracted from a spent fuel of a light water reactor.

In an embodiment according to any of the above nuclear fuel pebbles or any of the above methods, the fuel particles include transuranic elements extracted from a nuclear weapon.

BRIEF DESCRIPTION OF THE DRAWINGS

Embodiments of the invention will now be described by way of example with reference to the accompanying drawings, of which.

DETAILED DESCRIPTION OF PARTICULAR EMBODIMENTS

The following detailed description can be read in connection with the accompanying drawings in which like numerals designate like elements.

Figure 1:
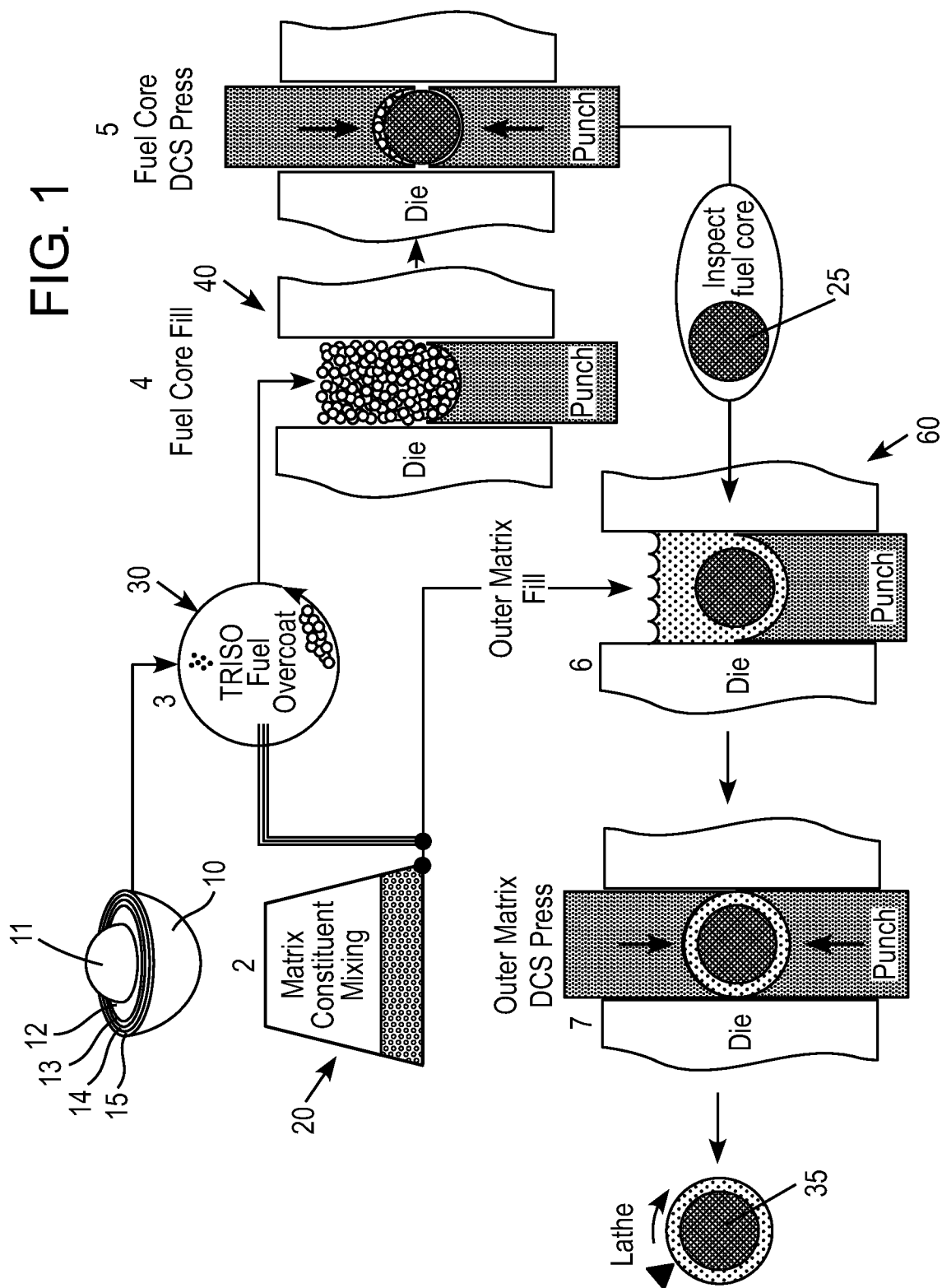
FIG. 1 is a schematic diagram illustrating steps of a process of forming nuclear fuel pebbles according to an embodiment of the invention.

FIG. 1 is a schematic diagram illustrating steps of the formation and processing of nuclear fuel pebbles in accordance with methods described above. In FIG. 1, a plurality of micro-encapsulated fuel particles 10 is added to a coating station 30. The coating station 30 may be a rotary evaporator or fluidized bed. Each of the plurality of micro-encapsulated fuel particles 10 may be tristructural-isotropic (TRISO) fuel particles. The term "TRISO fuel particle," as used herein, refers to any type of micro fuel particle comprising a fuel kernel and one or more layers of isotropic materials surrounding the fuel kernel. By way of example only, the fuel particle 10 may have a diameter of about 1 millimeter.

In the embodiment shown in FIG. 1, the fuel particle 10 includes a fuel kernel 11 at its center. The fuel kernel may comprise fissile and/or fertile materials (e.g., uranium, plutonium, thorium, etc.) in an oxide, carbide, or oxycarbide form. In a particular embodiment, the fuel kernel 11 includes low enriched uranium (LEU) of any suitable enrichment level.

When the fuel element is used for waste mitigation and/or disposal purposes, the fuel kernel 11 may alternatively or additionally include transuranics (TRU) and/or fission products extracted or otherwise reprocessed from spent fuels.

For example, the fuel element may be used for destruction of transuranic waste generated from, for example, light water reactors or decommissioned nuclear weapons. For that purpose, the fuel element may include fuel kernels 11 formed of transuranic elements extracted from a spent fuel of a light water reactor and/or a core of a nuclear weapon. According to a particular embodiment, a fuel element formed in accordance with the described methods may be used as fuel for a light water reactor to destroy the transuranic waste while, at the same time, generating power from it.

The fuel particle 10 illustrated in FIG. 1 also includes four distinct layers coated over the fuel kernel 11, namely (1) a porous carbon buffer layer 15; (2) an inner pyrolytic carbon (PyC) layer 14; (3) a ceramic layer 13; and (4) an outer PyC layer 12.

The porous carbon buffer layer 15 surrounds the fuel kernel 11 and serves as a reservoir for accommodating buildup of fission gases diffusing out of the fuel kernel 11 and any mechanical deformation that the fuel kernel 11 may undergo during the fuel cycle.

The inner PyC layer 14 may be formed of relatively dense PyC and seals the carbon buffer layer 15.

The ceramic layer 13 may be formed of a SiC material and serves as a primary fission product barrier and a pressure vessel for the fuel kernel 11, retaining gaseous and metallic fission products therein. The ceramic layer 13 also provides overall structural integrity of the fuel particle 10.

In some embodiments, the SiC in the ceramic layer 13 may be replaced or supplemented with zirconium carbide (ZrC) or any other suitable material having similar properties as those of SiC and/or ZrC.

The outer PyC layer 12 protects the ceramic layer 13 from chemical attack during operation and acts as an additional diffusion boundary to the fission products. The outer PyC layer 12 may also serve as a substrate for bonding to a surrounding ceramic matrix.

The configuration and/or composition of the fuel particle 10 are not limited to the embodiments described above. Instead, it should be understood that a fuel particle consistent with the present disclosure may include one or more additional layers, or omit one or more layers, depending on the desired properties of the fuel particle.

In FIG. 1, the fuel particles 10 are overcoated in step 3 in coating station 30 by a ceramic matrix powder formed in a matrix constituent mixing station 20. The ceramic matrix powder can include graphite or silicon carbide (SiC).

In particular embodiments, the ceramic matrix powder includes SiC powder mixed in step 2 with rare earth oxide neutronic poisons alone or in combination with additional sintering additives. Prior to the mixing, the fuel particles 10 may be coated with a suitable surface protection material. The SiC powder may have an average size of less than 1 μm and/or a specific surface area greater than 20 m²/g. By way of example, the size of the SiC powder may range from about 15 nm to about 51 nm with the mean particle size being about 35 nm.

The rare earth oxide neutronic poisons are selected based on a combination of the effectiveness of the element in capturing thermal neutrons, as well as, its compatibility with, and ability to aid in, the fabrication process. Examples of suitable rare-earths include $Eu_2O_3$, $Gd_2O_3$, $Dy_2O_3$, and $Er_2O_3$.

In addition to the rare earth oxide neutronic poisons, additional sintering additives may be added. Acceptable additional sintering additives include, for example, alumina and other rare earth oxides, such as $Y_2O_3$. The additional sintering additives may be added individually or in combination, to the SiC powder and/or coated onto the SiC powder surface. In certain embodiments, the total amount of rare earth oxide neutronic poisons and sintering additives is up to 10 weight %, or, in more certain embodiments, from 0.5 to 10 weight %, from 1 to 10 weight %, from 1 to 6 weight %, or from 2 to 6 weight % of the total weight of the ceramic matrix powder.

In certain embodiments, the ceramic matrix powder includes graphite. In such embodiments, the ceramic matrix powder can also include a mixture of natural and artificial powders along with up to 20 weight % phenolic or other resin binder of the total weight of the ceramic matrix powder. The resin chosen may be a thermosetting resin.

The amount of ceramic materials over-coated onto the microencapsulation is calculated dependent on reactor neutron considerations and the known final density of the ceramic that acts as moderator, and possibly poison. In certain embodiments, the amount of ceramic materials results in a TRISO volume fraction of 20 to 45%, 25 to 42%, or 30 to 35%.

Further in FIG. 1, the over-coated fuel is transferred into a first direct current sintering (DCS) press 40 in step 4. Within press 40, the over-coated fuel is subjected to a first current and first pressure, with the passage of first current through first DCS press 40 creating a particular temperature, to form a fuel pebble 25 in step 5.

In embodiments in which the ceramic matrix powder includes silicon carbide, the first current and first pressure are controlled to obtain a fuel pebble 25 with 3.22 g/cc envelope density (near theoretical). In certain embodiments, the first current is in an amount to create a temperature from 1650 to 1900° C., 1700 to 1850° C., or 1800 to 1850° C. In certain embodiments, the first pressure is less than 30 MPa, or, in certain embodiments, less than 20 MPa, or, in more certain embodiments, about 10 MPa.

In embodiments in which the ceramic matrix powder includes graphite, the first current is in an amount to create a temperature from 700 to 1900° C. The first pressure applied during step 5 is dependent on the final volume fraction of fuel and is variable dependent on the temperature history.

Further in FIG. 1, once spherical fuel pebble 25 is formed, it is inspected and then transferred into second DCS press 60, which is larger than first die 40, in step 6. Prior to placing fuel pebble 25 in second DCS press 60, ceramic matrix powder from matrix constituent mixing station 20 is added to second DCS press 60 in an amount such that fuel pebble 25 can be placed in the center of a bed of the ceramic matrix powder. Additional ceramic matrix powder can be added above fuel pebble 25 before pressing in second DCS press 60.

Step 7 of pressing a fuel pebble in the second DCS press 60 to form a composite fuel pebble 35 includes subjecting the fuel pebble to a second current and second pressure, with the passage of second current through second DCS press 60 creating a particular temperature, to form composite fuel pebble 35.

Further in FIG. 1, once removed from second DCS press 60, composite fuel pebble 35 undergoes machining to smooth the surface of composite fuel pebble 35. Such machining can include a lathe.

Figure 2:
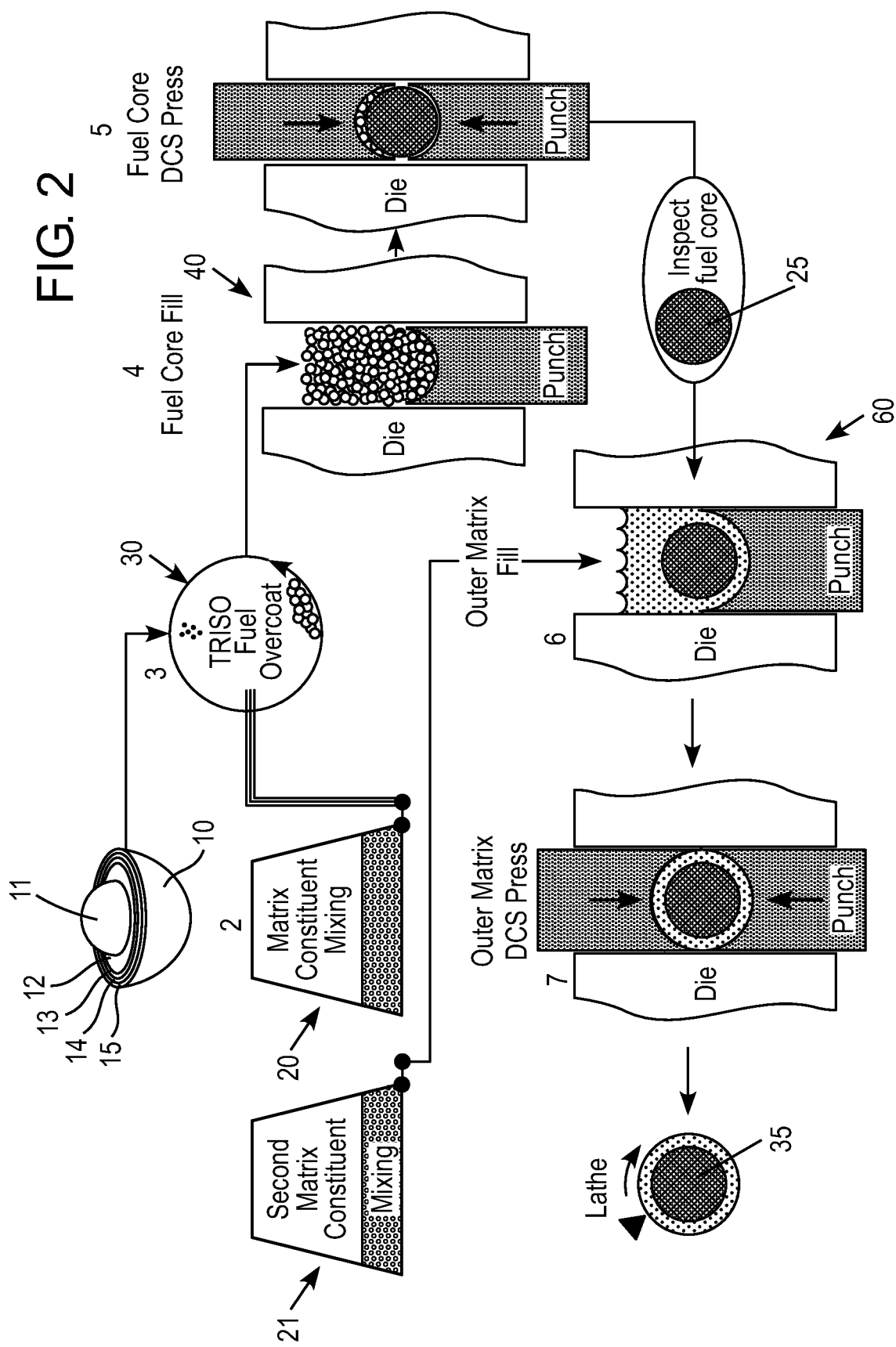
FIG. 2 is a schematic diagram illustrating steps of a process of forming nuclear fuel pebbles according to another embodiment of the invention.

FIG. 2 is a schematic diagram illustrating steps of the formation and processing of nuclear fuel pebbles in accordance with methods described above. The method illustrated in FIG. 2 includes the same steps and stations as the method in FIG. 1, except there are two matrix constituent mixing stations. Specifically, FIG. 2 includes matrix constituent mixing station 20 where the matrix is mixed that forms the ceramic matrix powder to be overcoated onto fuel particles 10 in the coating station 30. FIG. 2 also includes a second matrix constituent mixing station 21 where the matrix is mixed that forms the non-fueled matrix ceramic that is added to second DCS press 60 prior to placing fuel pebble 25 therein. Second matrix constituent mixing station 21 is also the source for the additional ceramic matrix powder that can be added above fuel pebble 25 before pressing in second DCS press 60.

By using both matrix constituent mixing station 20 and second matrix constituent mixing station 21, the ceramic matrix powder overcoated onto fuel particles 10 and the non-fueled matrix ceramic surrounding fuel pebble 25 can be formed of different compositions. The compositions can be merely different amounts of the same constituents, the compositions can contain some different constituents, or the compositions can contain all different constituents.

Examples of different compositions for the ceramic matrix powder and non-fueled matrix ceramic include: (1) a graphite matrix forming the ceramic matrix powder and a different graphite matrix forming the non-fueled matrix ceramic; (2) a graphite matrix forming the ceramic matrix powder and a SiC matrix forming the non-fueled matrix ceramic; (3) a SiC matrix forming the ceramic matrix powder and a different SiC matrix forming the non-fueled matrix ceramic; and (4) a SiC matrix forming the ceramic matrix powder and a graphite matrix forming the non-fueled matrix ceramic. In particular embodiments, a SiC matrix forms the ceramic matrix powder and a graphite matrix forms the non-fueled matrix ceramic.

Figure 3:
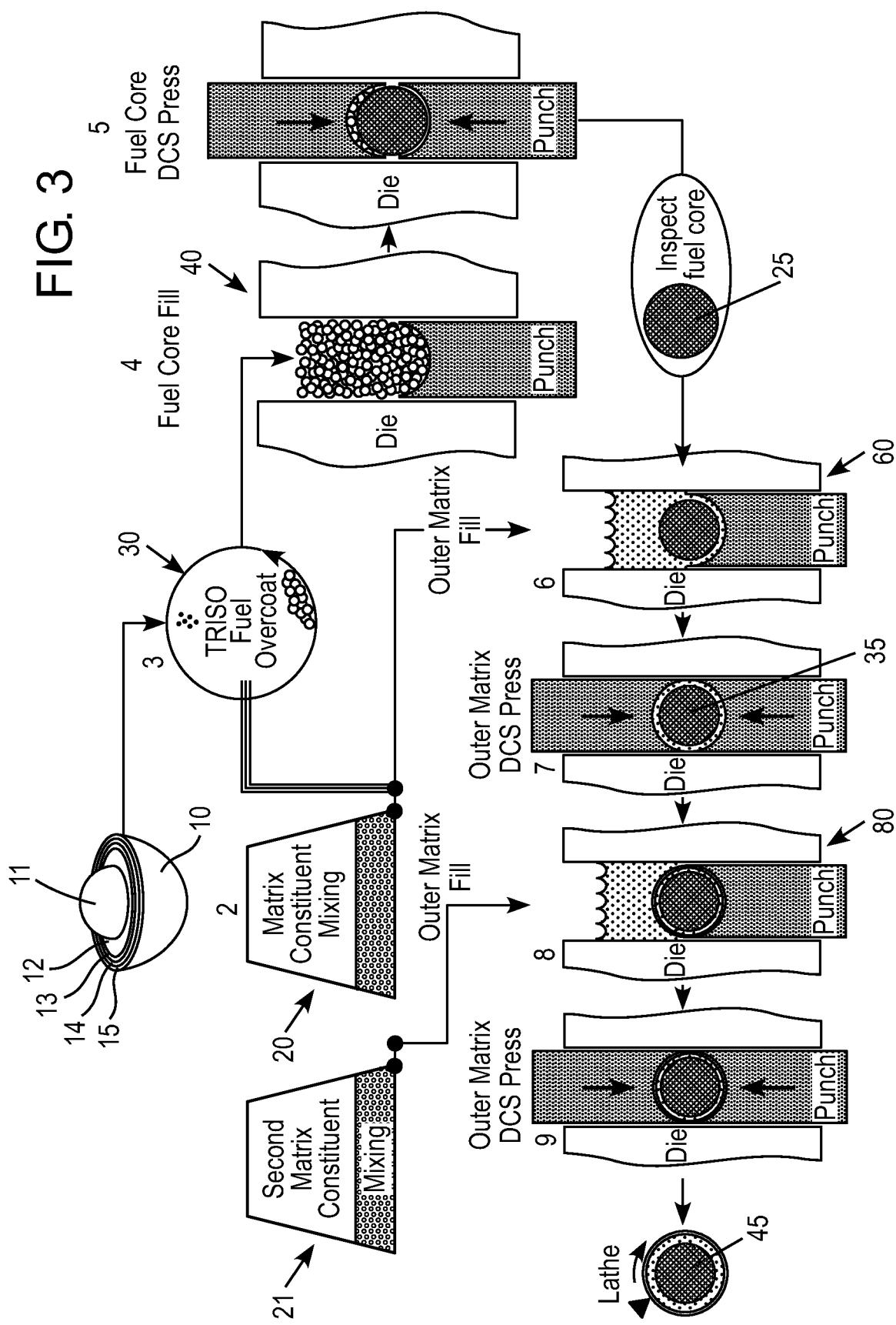
FIG. 3 is a schematic diagram illustrating steps of a process of forming nuclear fuel pebbles according to yet another embodiment of the invention.

FIG. 3 is a schematic diagram illustrating steps of the formation and processing of nuclear fuel pebbles in accordance with methods described above. The method illustrated in FIG. 3 includes the same steps and stations as the method in FIG. 2, except there is also a third DCS press 80 that is used in steps 6B and 7B to form an additional layer of non-fueled matrix ceramic onto the composite fuel pebble 35. Specifically, FIG. 3 includes matrix constituent mixing station 20 connected to both the coating station 30 and second DCS die press 60 in the same manner as FIG. 1 so as to provide the ceramic matrix powder for forming fuel pebble 25 and the non-fueled matrix ceramic of composite fuel pebble 35.

FIG. 3 also includes second matrix constituent mixing station 21 connected to third DCS die press 80. Similar to steps 6 and 7 in FIGS. 1 and 2, steps 8 and 9 in FIG. 3 includes, prior to placing composite fuel pebble 35 in third DCS press 80, non-fueled matrix ceramic from second matrix constituent mixing station 21 is added to third DCS press 80 in an amount such that composite fuel pebble 35 can be placed in the center of a bed of the non-fueled matrix ceramic. Additional ceramic matrix powder can be added above composite fuel pebble 35 before pressing in third DCS press 80. In the embodiment in FIG. 3, a lesser amount of non-fueled matric ceramic from second matrix constituent mixing station 21 is added to third DCS press 80 than the amount of ceramic matrix powder from matrix constituent mixing station 20 added to second DCS press 60 so that the additional layer surrounding composite fuel pebble 35 is thinner than the layer surrounding fuel pebble 25.

In a certain embodiment, double shell fuel pebble 45 includes composite fuel pebble 35, including an fuel pebble 25 including graphite matrix surrounded by a thick graphite matrix, surrounded by a thin SiC matrix.

Matrix constituent mixing station 20 and second matrix constituent mixing station 21 can include the same differences in compositions of matrix as described with respect to those mixing stations in FIG. 2. Also, contrary to how it is illustrated in FIG. 3, matrix constituent mixing station 20 could be connected to only second DCS press 60 and matrix constituent mixing station 21 could be connected to both coating station 30 and third DCS press 80 such that the matrix of fuel pebble 25 and the outer layer surrounding composite fuel pebble 35 can be made of the same composition.

Step 9 of pressing a fuel pebble in third DCS press 80 to form double shell fuel pebble 45 includes subjecting the fuel pebble to a third current and third pressure, with the passage of third current through third DCS press 80 creating a particular temperature, to form double shell fuel pebble 45.

In certain embodiments, the fuel pebble 25 has a diameter between 40 and 60 mm, or about 50 mm. In particular embodiments, the total diameter of the composite pebble 35 or double shell fuel pebble 45 is between 50 and 70 mm, or about 60 mm. In certain embodiments, the thickness of the outer region or inner shell of the composite pebble 35 or double shell fuel pebble 45 is between 2 and 10 mm, or about 5 mm. In more certain embodiments, the thickness of the outer shell of double shell fuel pebble 45 is between 100 and 200 microns, or about 150 microns. A particular embodiment includes a double shell fuel pebble 45 having a graphite inner shell having a thickness between 5 and 10 mm and an SiC outer shell having a thickness between 100 and 200 microns.

Figure 4:
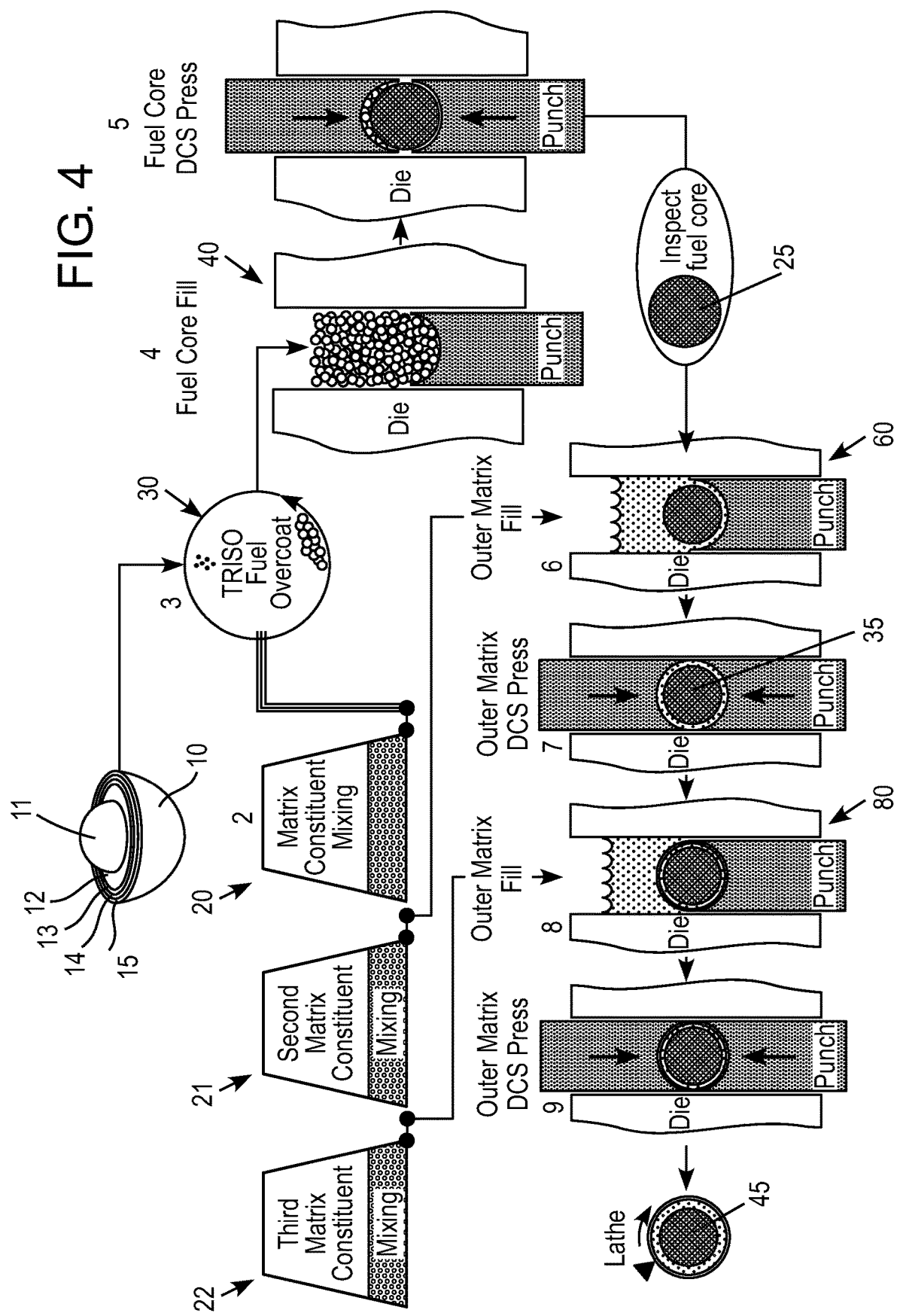
FIG. 4 is a schematic diagram illustrating steps of a process of forming nuclear fuel pebbles according to yet another embodiment of the invention.

FIG. 4 is a schematic diagram illustrating steps of the formation and processing of nuclear fuel pebbles in accordance with methods described above. The method illustrated in FIG. 4 includes the same steps and stations as the method in FIG. 3, except there are three matrix constituent mixing stations. Specifically, FIG. 4 includes matrix constituent mixing station 20 where the matrix is mixed that forms the ceramic matrix powder to be overcoated onto fuel particles 10 in coating station 30. FIG. 4 also includes second matrix constituent mixing station 21 where the matrix is mixed that forms the non-fueled matrix ceramic that is added to second DCS press 60 prior to placing fuel pebble 25 therein. Second matrix constituent mixing station 21 is also the source for the additional ceramic matrix powder that can be added above fuel pebble 25 before pressing in second DCS press 60. FIG. 4 also includes third matrix constituent mixing station 22 where the matrix is mixed that forms the non-fueled matrix ceramic that is added to third DCS press 80 prior to placing composite fuel pebble 35 therein. Third matrix constituent mixing station 22 is also the source for the additional ceramic matrix powder that can be added above composite fuel pebble 35 before pressing in third DCS press 80.

By using the combination of matrix constituent mixing station 20, second matrix constituent mixing station 21, and third matrix constituent mixing station 22, the ceramic matrix powder overcoated onto fuel particles 10, the non-fueled matrix ceramic surrounding fuel pebble 25, and the non-fueled matrix ceramic surrounding composite fuel pebble 35 can be formed of different compositions. The compositions can be merely different amounts of the same constituents, the compositions can contain some different constituents, or the compositions can contain all different constituents.

Examples of different compositions for the ceramic matrix powder and non-fueled matrix ceramic include: (1) a graphite matrix forming the ceramic matrix powder and two different graphite matrices forming the non-fueled matrix ceramic layers; (2) a graphite matrix forming the ceramic matrix powder and two different SiC matrices forming the non-fueled matrix ceramic layers; (3) a SiC matrix forming the ceramic matrix powder and two different SiC matrices forming the non-fueled matrix ceramic layers; and (4) a SiC matrix forming the ceramic matrix powder and two different graphite matrices forming the non-fueled matrix ceramic layers.

Figure 5:
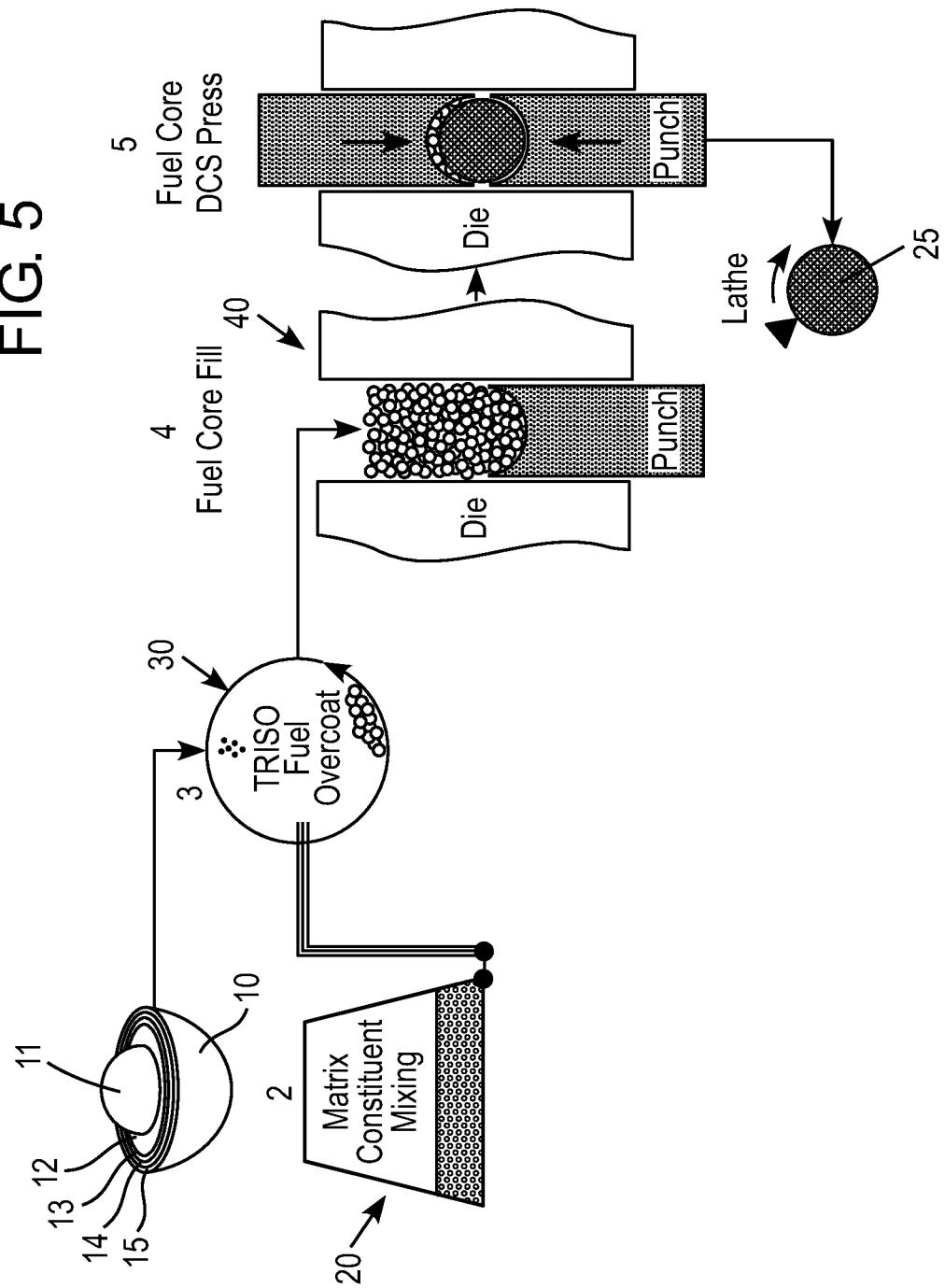
FIG. 5 is a schematic diagram illustrating steps of a process of forming nuclear fuel pebbles according to yet another embodiment of the invention.

FIG. 5 is a schematic diagram illustrating steps of the formation and processing of nuclear fuel pebbles in accordance with methods described above. The method illustrated in FIG. 5 includes the same steps and stations as the method in FIG. 1, except no additional layers are added to the fuel pebble 25. Instead, the nuclear fuel pebble is formed in the same manner as fuel pebble 25 in the embodiments illustrated and described with respect to FIG. 1, namely steps 2-5. Once removed from first DCS press 40, composite fuel pebble 25 undergoes machining to smooth the surface of composite fuel pebble 25. Such machining can include a lathe.

Although illustrated in separate figures, any features illustrated and described within one figure or embodiment could be substituted or added to any of the other embodiments described above.

Although described in connection with preferred embodiments thereof, it will be appreciated by those skilled in the art that additions, deletions, modifications, and substitutions not specifically described may be made without departure from the scope of the invention as defined in the appended claims.

What is claimed is:

1. A nuclear fuel pebble comprising:
   an inner fuel pebble including fuel particles microencapsulated within a fully ceramic matrix; and
   a non-fueled matrix ceramic surrounding the inner fuel pebble.

2. The nuclear fuel pebble according to claim 1, wherein the fuel particles are tristructural-isotropic fuel particles (TRISO).

3. The nuclear fuel pebble according to claim 1, wherein the fully ceramic matrix comprises graphite or silicon carbide.

4. The nuclear fuel pebble according to claim 1, wherein the non-fueled matrix ceramic comprises graphite.

5. The nuclear fuel pebble according to claim 4, wherein the non-fueled matrix ceramic further comprises phenolic or other resin binder.

6. The nuclear fuel pebble according to claim 1, wherein the non-fueled matrix ceramic comprises silicon carbide.

7. The nuclear fuel pebble according to claim 6, wherein the non-fueled matrix ceramic further comprises a rare-earth oxide neutronic poison selected from the group consisting of $Gd_2O_3$, $Er_2O_3$, $Dy_2O_3$, and $Eu_2O_3$, and combinations thereof.

8. The nuclear fuel pebble according to claim 6, wherein the non-fueled matrix ceramic further comprises sintering additives selected from the group consisting of $Al_2O_3$ and $Y_2O_3$ and combinations thereof.

9. The nuclear fuel pebble according to claim 1, wherein the inner fuel pebble is sintered using direct current sintering prior to being surrounded by the non-fueled matrix ceramic.

10. The nuclear fuel pebble according to claim 9, wherein the nuclear fuel pebble is sintered using direct current sintering on the already sintered inner fuel pebble surrounded by the non-fueled matrix ceramic.

\* \* \* \* \*